United States Patent [19]

Breitbach

[11] 4,004,338

[45] Jan. 25, 1977

[54] SNAP RING TOOL

[75] Inventor: Francis John Breitbach, Dubuque, Iowa

[73] Assignee: Deere & Company, Moline, Ill.

[22] Filed: Nov. 4, 1975

[21] Appl. No.: 628,795

[52] U.S. Cl. .................................................. 29/229
[51] Int. Cl.² .......................................... B23P 19/04
[58] Field of Search .................... 29/229, 223, 225; 81/43, 302

[56] References Cited

UNITED STATES PATENTS

| | | | |
|---|---|---|---|
| 1,445,710 | 2/1923 | Rathbone et al. | 81/43 |
| 3,155,385 | 11/1964 | Lee | 81/43 |
| 3,169,307 | 2/1965 | Langwell | 29/229 |

FOREIGN PATENTS OR APPLICATIONS

| | | | |
|---|---|---|---|
| 887,029 | 8/1953 | Germany | 29/223 |

*Primary Examiner*—Al Lawrence Smith
*Assistant Examiner*—Roscoe V. Parker Jr.

[57] ABSTRACT

Two snap ring tools respectively for installing or removing internal of external snap rings, of the type having holes provided at opposite ends thereof for reception of tool points, are disclosed. Each tool includes first and second elongate arms having pivotally interconnected first ends and point-carrying second ends. A lever support member is adjustably slidably mounted on the first arm and a lever is pivotally connected thereto and operatively engaged with the second arm so as to effect pivotal movement of the latter upon pivotal movement of the lever. The lever may be moved to an overcenter position for holding a snap ring in a deflected state without the application of an external force to the lever.

4 Claims, 7 Drawing Figures

SNAP RING TOOL

BACKGROUND OF THE INVENTION

The present invention relates to a tool for installing or removing snap rings of a type having their opposite ends provided with holes for the insertion of tool points.

Known snap ring tools are constructed similar to a common pair of pliers in that they include a pair of arms pivotally joined by a connection located between point-carrying ends and hand-grippable portions of the arms. These tools suffer from the disadvantage that the leverage that can be applied is limited by the requirement that the arms be grippable by one hand and from the disadvantage that the points move during deflecting a snap ring such as to cause the snap ring to slip from the points unless the latter are bent to prevent such slipping in which case it is difficult to insert the points in the holes provided in the opposite ends of the snap rings.

SUMMARY OF THE INVENTION

According to the present invention there is provided a novel tool for installing or removing a snap ring.

A broad object of the invention is to provide a snap ring tool of a simple economical construction which is capable of effectively and safely deflecting a snap ring so that the latter may be removed or installed.

A more specific object of the invention is to provide a snap ring tool having an operating handle which is mounted so as to effect an increasing mechanical advantage as the snap ring is increasingly deflected.

Another object of the invention is to provide an operating handle as is described in the preceeding paragraph which moves over center to lock the deflected snap ring in position without necessitating further force to be exerted on the handle.

Yet another object is to provide a snap ring tool designed for use with both hands so as to give greater control of the snap rings during placement and removal thereof.

Still another object of the invention is to provide a snap ring tool having points which remain substantially parallel during deflection of the snap ring.

Another object is to provide a snap ring tool having removable points.

These and other objects will become apparent from reading the following description in conjunction with the appended drawings.

DESCRIPTION OF THE PREFERRED EMBODIMENT

Figures 1, 2, 3, 4, 5, 6, 7:
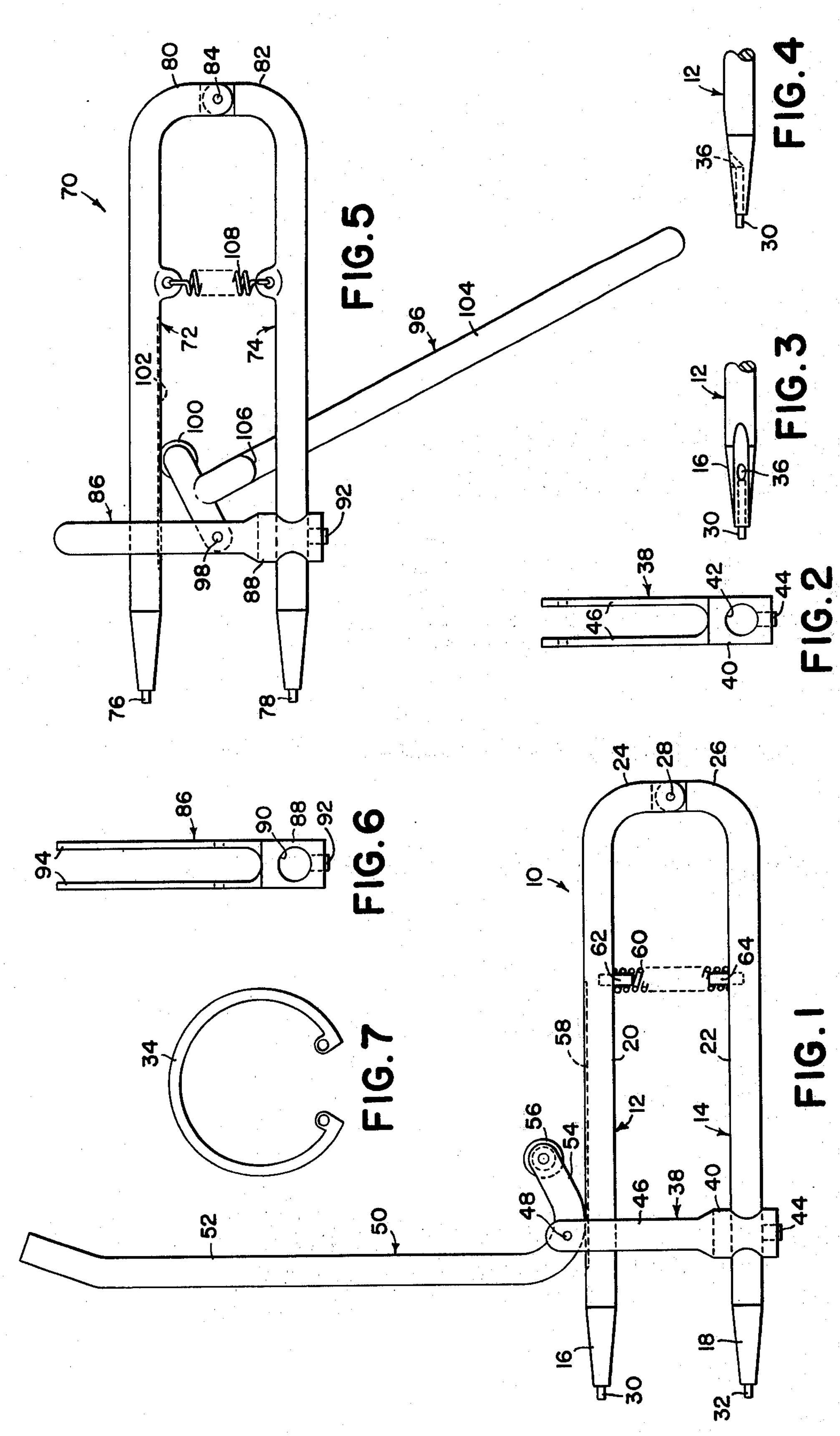
FIG. 1 is a side elevational view of a snap ring tool constructed according to the principles of the present invention so as to be usable with internal snap rings.
FIG. 2 is a side view of the lever support member shown in FIG. 1.
FIG. 3 is a top plan view showing the connection of the tool points with the forward end of one of the arms of the tool shown in FIG. 1.
FIG. 4 is a side view of the arm portion shown in FIG. 3.
FIG. 5 is a side elevational view of a second embodiment of the snap ring tool of the present invention constructed for removing or installing external snap rings.
FIG. 6 is a view of the lever support member shown in FIG. 5 taken along the line 6—6.
FIG. 7 is a view of a typical internal snap ring with which the tool shown in FIG. 1 is adapted for use.

Referring now to FIG. 1, there is shown an internal snap ring tool indicated in its entirety by the reference numeral 10. As viewed in FIG. 1, the tool 10 includes upper and lower arms 12 and 14, respectively, fashioned from respective cylindrical rods. The arms 12 and 14 respectively, have tapered left ends 16 and 18, horizontal central portions 20 and 22 and down and upturned right end portions 24 and 26, the right end portions 24 and 26 being hingedly interconnected by means including a horizontal pivot pin 28.

Projecting from the tapered left ends 16 and 18 of the arms 12 and 14 are respective points 30 and 32 which are provided for insertion in holes located in the opposite ends of a typical snap ring, such a snap ring being shown at 34 in FIG. 7. The points 30 and 32 are removably mounted and since they are mounted in a similar manner only the details of the mounting of the point 30 is shown in detail and such details appear in FIGS. 3 and 4. Specifically, the point 30 is press-fitted into an axial socket located in the tapered end 16 of the arm 12 and a knock out hole 36 extends from the exterior of the arm to the socket to the rear of the point 30 so that a tool may be inserted in the hole 36 to remove the point 30.

A lever support member 38 is slidably mounted on the lower arm 14. Specifically, the support member 38 is fashioned from a rod and includes a base portion 40 having a hole or opening 42 therein which slidably receives the lower arm 14. A set screw 44 extends from the bottom of the base portion 40 into the hole or opening 42 for fixing the member 38 in selected positions along the arm 14. Extending upwardly from the base portion 40 of the support member 38 are opposite legs 46 which straddle the upper arm 12. Located coplanar with the upper and lower arms 12 and 14 and pivotally connected, as by a pivot pin 48, to the legs 46 at a location above the arm 14 is an L-shaped lever 50 having an upright first leg defining a handle 52 and having a rightwardly extending relatively short leg 54, the pivot pin 48 extending through the lever 50 at a location in the vicinity of the juncture of the handle 52 with the leg 54. A cam surface in the form of a roller 56 is rotatably mounted in the right end of the leg 54 and a groove 58 is provided in the upper surface of the upper arm 12 for receiving the roller 56 and guiding it leftwardly when the handle 52 is pivoted clockwise about the pin 48 from its substantially upright position shown in FIG. 1. A coil compression spring 60 is located between and has its opposite ends engaged with the upper and lower arms 12 and 14 and is held in place by respective projections 62 and 64 fixed to the arms 12 and 14. Thus, it will be appreciated that as viewed in FIG. 1, the spring 60 acts to bias the arms 12 and 14 away from each other.

The operation of the snap ring tool 10 is as follows. When installing or removing a snap ring such as that indicated at 34 in FIG. 7, the points 30 and 32 are first positioned in the holes at the opposite ends of the snap ring. If it is necessary to move the points 30 and 32 closer together from their extreme moved apart position shown in FIG. 1 in order to align them with the holes in the opposite ends of the snap ring, this may be done by rotating the handle 52 clockwise from its position shown in FIG. 1 to cause the roller 56 to engage the arm 12 and rotate the latter counterclockwise about the pivot pin 28. When the points 30 and 32 are at the appropriate position for insertion in the holes at the opposite ends of the snap ring, they are so inserted and the handle 52 is further rotated in the clockwise direction until the roller 56 moves over center relative to the pivot pin 48. At this point, the operator may remove his hand from the handle 52 as the handle 52 will then be in an extreme position against the upper arm 12 and it will be retained there by the force exerted by the now deflected snap ring. The operator may now use both of his hands to guide the snap ring.

Should the operator encounter a snap ring having holes in the opposite ends thereof which are not compatible with points that are installed in the ends of the arms 12 and 14, he may remove the points by inserting a tool in the respective knock out holes the arms 12 and 14 and replace the points with compatible points.

Also, if the operator finds that he is unable to obtain sufficient deflection of the snap ring through rotation of the handle 52, he may increase the deflection by adjusting the lever support member 38 towards the pivot pin 28. To do this he need only to loosen the set screw 44 and slide the member 38 along the lower arm 14.

Referring now to the embodiment disclosed in FIG. 5, therein is shown an external snap ring tool 70. The tool 70 is quite similar to the internal snap ring tool 10 described above and includes upper and lower arms 72 and 74 having respective tapered left ends provided with replaceable points 76 and 78 and having respective downturned and upturned right end portions 80 and 82 pivotally interconnected by a horizontal pivot pin 84.

Mounted on the lower arm 74 so as to be adjustable therealong, is an upright lever support member 86 including a base portion 88 provided with an opening 90 in which is received the lower arm 74. A set screw 92 is located in the base portion 88 and extends into the opening 90 so as to fix the member 86 in a desired position. The member 86 has a pair of legs 94 which extend upwardly on opposite sides of the upper arm 72.

For the purpose of forcibly moving the arms 72 and 74 apart, there is provided a lever 96 which is generally T-shaped as viewed in FIG. 5 with one end of the head of the T being pivotally connected as at a pivot pin 98 to the legs 94 at a location below the upper arm 72 and with the other end of the head of the T being provided with a roller 100 which is disposed in engagement with a groove 102 in a lower portion of the arm 72. The stem of the T-shaped lever 96 is defined by a handle 104 offset as at 106 so as to clear the lower arm 74. A helically wound tension spring 108 is connected between the upper and lower arms 74 and 76 so as to bias them towards each other.

The operation of the snap ring tool embodiment shown in FIG. 5 is quite similar to that shown in FIG. 1 except that here the tool is adapted for use with externally mounted snap ring and the handle 104 is rotatable counterclockwise from its position shown to cause the arms 72 and 74 to be moved apart so as to effect deflection of a snap ring having its opposite ends engaged with the points 76 and 78. When the handle is rotated counterclockwise far enough to move the roller 100 over center relative to the pivot pin 98, the underside of the arm 72 will engage the offset portion 106 of the handle 104 so as to prevent further counterclockwise movement thereof.

Thus, it will be appreciated that the respective snap ring tool embodiments shown in FIGS. 1 and 5 are of a simple construction requiring a minimum amount of manual force to operate.

I claim:

1. In a snap ring tool of a type including first and second elongate arms pivotally interconnected to each other and having respective free ends configured for engaging opposite ends of a snap ring for deflecting the latter upon pivotal movement of the arms; the improvement comprising: lever support means fixed to the first arm at a location between the free end of the first arm and the pivotal interconnection of the first and second arms; a lever pivotally connected to said support means and having a cam surface; said second arm including a recessed surface defining a guide for the cam surface; and the cam surface being located in such relationship to the pivotal connection of the lever with the support and to the recessed surface that the cam surface will engage the recessed surface and will cause the second arm to pivot in a first direction of movement when the lever is pivoted in a first direction of movement.

2. The snap ring tool defined in claim 1 wherein said first and second arms have respective second ends; the pivotal interconnection between the arms being at the second ends, and said lever support means being slidably mounted on said first arm and including releasable securing means for selectively securing it to the first arm.

3. The snap ring tool defined in claim 1 wherein said lever is pivotally attached to the lever support means at a location between the first and second arms; and said lever being mounted intermediate first and second ends thereof with the cam surface located at the first end and being disposed to move the free end of the second arm away from the free end of the first arm when the lever is pivoted in the first direction of movement thereof.

4. The snap ring tool defined in claim 1 wherein said cam surface of the lever is a roller.

* * * * *